United States Patent
Purdy et al.

(10) Patent No.: US 12,031,269 B2
(45) Date of Patent: *Jul. 9, 2024

(54) MODIFIED SULFURIC ACID AND USES THEREOF

(71) Applicant: SixRing Inc., Calgary (CA)

(72) Inventors: Clay Purdy, Medicine Hat (CA); Markus Weissenberger, Calgary (CA); Markus Pagels, Calgary (CA); Kyle G Wynnyk, Calgary (CA)

(73) Assignee: SIXRING INC., Calgary (CA)

( * ) Notice: Subject to any disclaimer, the term of this patent is extended or adjusted under 35 U.S.C. 154(b) by 166 days.

This patent is subject to a terminal disclaimer.

(21) Appl. No.: 17/407,424

(22) Filed: Aug. 20, 2021

(65) Prior Publication Data

US 2022/0267952 A1 Aug. 25, 2022

(30) Foreign Application Priority Data

Feb. 25, 2021 (CA) ...................................... 3110364

(51) Int. Cl.
  *D21C 3/00* (2006.01)
  *D21C 3/04* (2006.01)
  *D21C 3/22* (2006.01)

(52) U.S. Cl.
  CPC ............... *D21C 3/003* (2013.01); *D21C 3/04* (2013.01); *D21C 3/22* (2013.01)

(58) Field of Classification Search
  None
  See application file for complete search history.

(56) References Cited

U.S. PATENT DOCUMENTS

| | | | |
|---|---|---|---|
| 4,113,747 A * | 9/1978 | Prescher | C07C 409/24 562/6 |
| 7,771,737 B2 | 8/2010 | Man et al. | |
| 10,053,438 B2 * | 8/2018 | Bolz | C07C 41/09 |
| 2004/0099637 A1 * | 5/2004 | Johnson | H05K 3/383 216/83 |
| 2010/0291722 A1 * | 11/2010 | Kim | C23F 1/26 252/79.3 |
| 2012/0217500 A1 * | 8/2012 | Park | H01L 29/78669 257/E33.053 |
| 2013/0122701 A1 * | 5/2013 | Krupa | C23F 1/28 148/22 |
| 2016/0244913 A1 | 8/2016 | Tsuruga et al. | |
| 2016/0304989 A1 * | 10/2016 | Pujari | C22B 25/06 |
| 2018/0187129 A1 * | 7/2018 | Traistaru | C11D 3/3409 |
| 2022/0170206 A1 * | 6/2022 | Purdy | D21C 9/163 |
| 2022/0267954 A1 * | 8/2022 | Purdy | D21C 3/04 |

FOREIGN PATENT DOCUMENTS

| | | | |
|---|---|---|---|
| CN | 109898085 A | * | 6/2019 |
| CN | 111979819 A | | 11/2020 |
| JP | 10101642 A | * | 4/1998 |
| WO | 2021125362 A1 | | 6/2021 |

OTHER PUBLICATIONS

CN 104060307 A (English Language Abstract) (Year: 2014).*
CN 104060308 A (English Language Abstract) (Year: 2014).*
CN 109898085 A English language Abstract (Year: 2019).*
CN 109628934 A English language Abstract (Year: 2019).*
PCT/CA2021/000069 International Search Report and Written Opinion dated Nov. 16, 2021.

* cited by examiner

*Primary Examiner* — Joseph D Anthony
(74) *Attorney, Agent, or Firm* — Blank Rome LLP

(57) ABSTRACT

An aqueous composition comprising: sulfuric acid; an alkanesulfonic acid; and a peroxide. Said composition being capable of delignifying biomass under milder conditions than conditions under which kraft pulping takes place.

8 Claims, No Drawings

MODIFIED SULFURIC ACID AND USES THEREOF

FIELD OF THE INVENTION

The present invention is directed to a method and composition useful in decomposing organic material by oxidation such as, but not limited to, the delignification of wood or plant substance, as an example and more specifically, to a method and composition for performing such under more optimal conditions than those under which the kraft process is currently conducted.

BACKGROUND OF THE INVENTION

The first step in paper production and most energy-intensive one is the production of pulp. Notwithstanding water, wood and other plant materials used to make pulp contain three main components: cellulose fibers; lignin; and hemicelluloses. Pulping has a primary goal to separate the fibers from the lignin. Lignin is a three-dimensional polymer which figuratively acts as a mortar to hold all the fibers together within the plant. Its presence in finished pulp is undesirable and adds nothing to the finished product. Pulping wood refers to breaking down the bulk structure of the fiber source, be it chips, stems or other plant parts, into the constituent fibers. The cellulose fibers are the most desired component when papermaking is involved. Hemicelluloses are shorter branched polysaccharide polymers consisting of various sugar monosaccharides which form a random amorphous polymeric structure. The presence of hemicellulose in finished pulp is also regarded as bringing no value to a paper product. This is also true for biomass conversion. The challenges are similar. Only the desired outcome is different. Biomass conversion would have the further breakdown to monosaccharides as a desired outcome while a pulp & paper process normally stops right after lignin dissolution.

There are two main approaches to preparing wood pulp or woody biomass: mechanical treatment and chemical treatment. Mechanical treatment or pulping generally consists of mechanically tearing the wood chips apart and, thus, tearing cellulose fibers apart in an effort to separate them from each other. The shortcomings of this approach include: broken cellulose fibers, thus shorter fibers and lignin being left on the cellulose fibers thus being inefficient or non-optimal. This process also consumes large amounts of energy and is capital intensive. There are several approaches included in chemical pulping. These are generally aimed at the degradation the lignin and hemicellulose into small, water-soluble molecules. These now degraded components can be separated from the cellulose fibers by washing the latter without depolymerizing the cellulose fibers. The chemical process is currently energy intensive as well as high amounts of heat and/or higher pressures are typically required; in many cases, agitation or mechanical intervention are also required, further adding inefficiencies and costs to the process.

There exist pulping or treatment methods which combine, to a various extent, the chemical aspects of pulping with the mechanical aspects of pulping. To name a few of the widely employed pulping methods referred to above, one must include thermomechanical pulping (also commonly referred to as TMP), and chemi-thermomechanical pulping (CTMP). Through a selection of the advantages provided by each general pulping method, the treatments are designed to reduce the amount of energy required by the mechanical aspect of the pulping treatment. This can also directly impact the strength or tensile strength degradation of the fibers subjected to these combination pulping approaches. Generally, these approaches involve a shortened chemical treatment (compared to conventional exclusive chemical pulping) which is then typically followed by mechanical treatment to separate the fibers.

The most common process to make pulp for paper production is the kraft process. In the kraft process, wood chips are converted to wood pulp which is almost entirely pure cellulose fibers. The multi-step kraft process consists of a first step where wood chips are impregnated/treated with a chemical solution. This is done by soaking the wood chips and then pre-heating them with steam. This step swells the wood chips and expels the air present in them and replaces the air with the liquid. This produces black liquor a resultant by-product from the kraft process. It contains water, lignin residues, hemicellulose and inorganic chemicals. White liquor is a strong alkaline solution comprising sodium hydroxide and sodium sulfide. Once the wood chips have been soaked in the various chemical solutions, they undergo cooking. To achieve delignification in the wood chips, the cooking is carried out for several hours at temperatures reaching up to 176° C. At these temperatures, the lignin degrades to yield water soluble fragments. The remaining cellulosic fibers are collected and washed after the cooking step.

U.S. Pat. No. 5,080,756 teaches an improved kraft pulping process and is characterized by the addition of a spent concentrated sulfuric acid composition containing organic matter to a kraft recovery system to provide a mixture enriched in its total sulfur content that is subjected to dehydration, pyrolysis and reduction in a recovery furnace. The organic matter of the sulfuric acid composition is particularly beneficial as a source of thermal energy that enables high heat levels to be easily maintained to facilitate the oxidation and reduction reactions that take place in the furnace, thus resulting in the formation of sulfide used for the preparation of cooking liquor suitable for pulping.

Caro's acid, also known as peroxymonosulfuric acid ($H_2SO_5$), is one of the strongest oxidants known. There are several known reactions for the preparation of Caro's acid but one of the most straightforward involves the reaction between sulfuric acid ($H_2SO_4$) and hydrogen peroxide ($H_2O_2$). Preparing Caro's acid in this method allows one yield in a further reaction potassium monopersulfate (PMPS) which is a valuable bleaching agent and oxidizer. While Caro's acid has several known useful applications, one noteworthy is its use in the delignification of wood.

Biofuel production is another potential application for the kraft process. One of the current drawbacks of biofuel production is that it requires the use of food grade plant parts (such as seeds) in order to transform polysaccharides into fuel in a reasonably efficient process. The carbohydrates could be obtained from cellulosic fibers, by using non-food grade biomass in the kraft process; however, the energy intensive nature of the kraft process for delignification makes this a less commercially viable option. In order to build a plant based chemical resource cycle there is a great need for energy efficient processes which can utilize plant-based feedstocks that don't compete with human food production.

While the kraft pulping process is the most widely used chemical pulping process in the world, it is extremely energy intensive and has other drawbacks, for example, substantial odours emitted around pulp producing plants or general emissions that are now being highly regulated in many pulp and paper producing jurisdictions. In light of the current environmental challenges, economic challenges and climactic changes, along with emission fees being implemented, it is highly desirable to optimize the current pulping processes. In order to provide at least linear quality fibers without the current substantial detriment to the environment during the production thereof. Accordingly, there still exists a need for a composition capable of performing delignification on wood substance under reduced temperatures and pressures versus what is currently in use without requiring any additional capital expenditures.

SUMMARY OF THE INVENTION

The inventors have developed novel compositions which are capable of being used to delignify biomass under room temperature conditions (i.e. 20-25° C.). While such compositions can also be used for other applications, it is noteworthy to point out that despite the fact that they contain sulfuric acid and peroxide, they present better handling qualities than conventional compositions comprising sulfuric acid and a peroxide component.

According to an aspect of the present invention, there is provided an aqueous acidic composition comprising:
sulfuric acid;
a modifying agent comprising an alkanesulfonic acid; and
a peroxide.

According to an aspect of the present invention, there is provided an aqueous acidic composition comprising:
sulfuric acid;
a modifying agent comprising an alkanesulfonic acid; and
wherein sulfuric acid and said alkanesulfonic acid are present in a molar ratio of no less than 1:1.

Preferably, said alkanesulfonic acid is selected from the group consisting of: alkanesulfonic acids where the alkyl groups range from C1-C6 and are linear or branched; and combinations thereof. Preferably, said alkanesulfonic acid is selected from the group consisting of: methanesulfonic acid; ethanesulfonic acid; propanesulfonic acid; 2-propanesulfonic acid; isobutylsulfonic acid; t-butylsulfonic acid; butanesulfonic acid; iso-pentylsulfonic acid; t-pentylsulfonic acid; pentanesulfonic acid; t-butylhexanesulfonic acid; and combinations thereof. More preferably, said alkanesulfonic acid is methanesulfonic acid. Also preferably, said alkanesulfonic acid has a molecular weight below 300 g/mol. Also preferably, said alkanesulfonic acid has a molecular weight below 150 g/mol.

Preferably, the sulfuric acid and said alkanesulfonic acid and are present in a molar ratio ranging from 28:1 to 2:1. More preferably, the sulfuric acid and alkanesulfonic acid are present in a molar ratio ranging from 24:1 to 3:1. Preferably, the sulfuric acid and alkanesulfonic acid are present in a molar ratio ranging from 20:1 to 4:1. More preferably, the sulfuric acid and alkanesulfonic acid are present in a molar ratio ranging from 16:1 to 5:1. According to a preferred embodiment of the present invention, the sulfuric acid and alkanesulfonic acid are present in a molar ratio ranging from 12:1 to 6:1.

According to another preferred embodiment of the present invention, the sulfuric acid and said alkanesulfonic acid and are present in a molar ratio ranging from 30:1 to 1:1. More preferably, the sulfuric acid and alkanesulfonic acid are present in a molar ratio ranging from 24:1 to 1:1. Preferably, the sulfuric acid and alkanesulfonic acid are present in a molar ratio ranging from 18:1 to 1:1. More preferably, the sulfuric acid and alkanesulfonic acid are present in a molar ratio ranging from 12:1 to 1:1. According to a preferred embodiment of the present invention, the sulfuric acid and alkanesulfonic acid are present in a molar ratio ranging from 6:1 to 1:1.

According to an aspect of the present invention, there is provided an aqueous composition for use in the delignification of biomass such as wood, wherein said composition comprises:
sulfuric acid;
a modifying agent comprising an alkanesulfonic acid; and
a peroxide.
wherein the sulfuric acid and the alkanesulfonic acid are present in a mole ratio ranging from 2:1 to 30:1.

According to an aspect of the present invention, there is provided an aqueous composition for use in the breaking down of cellulose from biomass (i.e. a plant source), wherein said composition comprises:
sulfuric acid present in an amount ranging from 20 to 70 wt % of the total weight of the composition;
modifying agent comprising an alkanesulfonic acid; and
a peroxide;
wherein the sulfuric acid and the alkanesulfonic acid are present in a mole ratio ranging from 2:1 to 30:1.

Preferably, the peroxide is hydrogen peroxide.

According to an aspect of the present invention, there is provided a method of delignification of biomass/plant material, said method comprising:
providing said plant material comprising cellulose fibers and lignin;
exposing said plant material requiring to a composition comprising:
sulfuric acid present in an amount ranging from 20 to 80 wt % of the total weight of the composition; and
a modifying agent comprising an alkanesulfonic acid;
for a period of time sufficient to remove substantially all of the lignin present on said plant material. Preferably, the composition further comprises a peroxide. Preferably, the composition comprises sulfuric acid present in an amount ranging from 20 to 70 wt % of the total weight of the composition. More preferably, the composition comprises sulfuric acid present in an amount ranging from 30-70 wt % of the total weight of the composition.

According to a preferred embodiment of the present invention, the modifying agent consists of an alkanesulfonic acid.

According to an aspect of the present invention, there is provided a one-pot process to separate lignin from a lignocellulosic feedstock, said process comprising the steps of:
providing a vessel;
providing said lignocellulosic feedstock;
providing a composition comprising;
an acid;
a modifying agent comprising an alkanesulfonic acid; and
a peroxide;
exposing said lignocellulosic feedstock to said composition in said vessel for a period of time sufficient to remove at least 80% of the lignin present said lignocellulosic feedstock;
optionally, removing a liquid phase comprising dissolved lignin fragments from a solid phase comprising cellulose fibres.

According to a preferred embodiment of the present invention, the composition consists of:
an acid;
a modifying agent comprising an alkanesulfonic acid; and
a peroxide.

Preferably, said alkanesulfonic acid has a molecular weight below 300 g/mol. More preferably, said alkanesulfonic acid has a molecular weight below 150 g/mol. According to a preferred embodiment of the present invention, the composition has a pH less than 1. According to another preferred embodiment of the present invention, the composition has a pH less than 0.5.

The inventors have discovered that delignification of biomass such as wood material/woody pulp (for example, but not limited to wood chips) can occur at substantially lower temperatures than those used during conventional kraft pulping process. In fact, experiments conducted at room temperature with preferred compositions according to the present invention were shown to degrade the lignin present in wood chips to free up cellulose fibers. According to a preferred embodiment of a method according to the present invention, a wood sample was dissolved at 30° C. upon exposure to a composition according to a preferred embodiment of the present invention. According to a preferred embodiment of the present invention, one could substantially reduce the energy input costs involved in current pulp delignification by applying a method involving a preferred composition of the present invention.

DESCRIPTION OF THE INVENTION

The experiments carried out using an aqueous acidic composition according to a preferred embodiment of the present invention as shown that wood chips can undergo delignification under controlled reaction conditions and eliminate or at least minimize the degradation of the cellulose. Degradation is understood to mean a darkening of cellulose, which is symbolic of an uncontrolled acid attack on the cellulose and staining thereof.

The alkanesulfonic acid together in the presence of sulfuric acid and the peroxide component, seems to generate a coordination of the compounds which acts as a modified sulfuric acid. In that respect, it is believed that the presence of the alkanesulfonic acid forms an adduct with the sulfuric acid to generate a modified sulfuric acid. The strength of the modified acid is dictated by the moles of sulfuric acid to the moles of the alkanesulfonic acid. Hence, a composition comprising a molar ratio of 6:1 of sulfuric acid: the alkanesulfonic acid would be much less reactive than a composition of the same components in a 28:1 molar ratio.

When performing delignification of wood using a composition according to a preferred embodiment of the present invention, the process can be carried out at substantially lower temperatures than temperatures used in the conventional kraft pulping process. The advantages are substantial, here are a few: the kraft pulping process requires temperatures in the vicinity of 176-180° C. in order to perform the delignification process, a preferred embodiment of the process according to the present invention can delignify wood at far lower temperatures, even as low as 20° C. According to a preferred embodiment of the present invention, the delignification of wood can be performed at temperatures as low as 0° C. According to a preferred embodiment of the present invention, the delignification of wood can be performed at temperatures as low as 10° C. According to a preferred embodiment of the present invention, the delignification of wood can be performed at temperatures as low as 30° C. According to another preferred embodiment of the present invention, the delignification of wood can be performed at temperatures as low as 40° C. According to yet another preferred embodiment of the present invention, the delignification of wood can be performed at temperatures as low as 50° C. According to yet another preferred embodiment of the present invention, the delignification of wood can be performed at temperatures as low as 60° C. Other advantages include: a lower input of energy; reduction of emissions and reduced capital expenditures; reduced maintenance; lower shut down/turn around costs; also there are health, safety and environment ("HSE") advantages compared to conventional kraft pulping compositions.

In each one of the above preferred embodiments, the temperature at which the processes are carried out are substantially lower than the current energy-intensive kraft process.

Moreover, the kraft process uses high pressures to perform the delignification of wood which is initially capital intensive, dangerous, expensive to maintain and has high associated turn-around costs. According to a preferred embodiment of the present invention, the delignification of wood can be performed at atmospheric pressure. This, in turn, circumvents the need for highly specialized and expensive industrial equipment such as pressure vessels/digestors. It also allows the implementation of delignification units in many of parts of the world where the implementation of a kraft plant would previously be impracticable due to a variety of reasons.

Some of the advantages of a process according to a preferred embodiment of the present invention, over a conventional kraft process are substantial as the heat/energy requirement for the latter is not only a great source of pollution but is in large part the reason the resulting pulp product is so expensive and has high initial capital requirements. The energy savings in the implementation of a process according to a preferred embodiment of the present invention would be reflected in a lower priced pulp and environmental benefits which would have both an immediate impact and a long-lasting multi-generational benefit for all.

Further cost savings in the full or partial implementation of a process according to a preferred embodiment of the present invention, can be found in the absence or minimization of restrictive regulations for the operation of a high temperature and high-pressure pulp digestors.

Experiment #1

Preparation of a Composition According to a Preferred Embodiment of the Present Invention For the $H_2SO_4$:$H_2O_2$:MSA blend with a 5:5:1 molar ratio, 50.6 g of concentrated sulfuric acid (93%) was mixed with 13.2 g MSA (70%). Then, 56.3 g of a hydrogen peroxide solution in water (29%) was slowly added to the acid. As the mixing releases a large amount of heat the beaker was placed in an ice bath. The mixing of the blend on this scale takes about 20 minutes. The pH of the resulting composition was less than 0.5.

Delignification Experiments

After mixing, the resulting composition is split into 4 equal parts. One part was exposed to 1.5 g of wood shavings, another part was exposed to commercially available lignin and another part was exposed to commercially available cellulose respectively and stirred at ambient conditions for 3 hours. The fourth part of the blend is kept as a blend reference sample.

Control tests were run for the respective mixtures with just kraft lignin or just cellulose added instead of biomass. Commercially available lignin (Sigma-Aldrich; Lignin, kraft; Prod #471003) was used as a control in the testing.

Commercially available cellulose (Sigma-Aldrich; Cellulose, fibers (medium); Prod #C6288) was also used as a control in the testing.

The solid phase of each blend was filtered off after 3 h of reaction time, rinsed with water and dried in an oven at 45° C. to constant weight. An effective blend should dissolve all lignin and leave the cellulose as intact as possible. The results of the experiments conducted with several compositions are reported in Table 1 below.

TABLE 1

Recovery of solids (% of initial mass) after 3 h reaction time

| Molar Ratio | Chemical | Wood Yield (%) | Lignin Yield (%) | Cellulose Yield (%) |
|---|---|---|---|---|
| 2:2:1 | $H_2SO_4:H_2O_2$:MSA | 40.8% | 2.3% | 93.9% |
| 5:5:1 | $H_2SO_4:H_2O_2$:MSA | 38.3% | 2.0% | 99.6% |
| 10:10:1 | $H_2SO_4:H_2O_2$:MSA | 42.0% | 0% | 93.2% |
| 20:20:1 | $H_2SO_4:H_2O_2$:MSA | 42.7% | 0% | 92.7% |

Additional testing was carried out to confirm the above initial results and to explore the feasibility of using other ratios or other compounds with similar chemical features or characteristics as modifying agent. According to a preferred embodiment of the present invention, the modifying agent is selected in the group consisting of: methanesulfonic acid (MSA); ethanesulfonic acid (ESA); aminomethanesulfonic (AMSA) and combinations thereof. According to a most preferred embodiment of the present invention, the modifying agent is MSA. The results of the experiments are set out below in Tables 2 to 4. Taurine was tested as a control compound against which other compounds are to be assessed.

TABLE 2

Recovery of solids (% of initial mass) after 3 h reaction time using ESA as modifying agent

| Molar Ratio | Chemicals | Wood Yield (%) | Lignin Yield (%) | Cellulose Yield (%) |
|---|---|---|---|---|
| 5:5:1 | $H_2SO_4:H_2O_2$:ESA | 47.8% | 0% | 97.5% |
| 10:10:1 | $H_2SO_4:H_2O_2$:ESA | 41.7% | 0% | 95.3% |
| 20:20:1 | $H_2SO_4:H_2O_2$:ESA | 49.4% | 0% | 95.8% |

TABLE 3

Recovery of solids (% of initial mass) after 3 h reaction time using AMSA as modifying agent

| Molar Ratio | Chemicals | Wood Yield (%) | Lignin Yield (%) | Cellulose Yield (%) |
|---|---|---|---|---|
| 5:5:1 | $H_2SO_4:H_2O_2$:AMSA | 43.5% | 0% | 92.2% |
| 10:10:1 | $H_2SO_4:H_2O_2$:AMSA | 38.4% | 1.4% | 94.5% |
| 20:20:1 | $H_2SO_4:H_2O_2$:AMSA | 37.2% | 0.6% | 98.9% |

TABLE 4

Recovery of solids (% of initial mass) after 3 h reaction time using taurine as modifying agent

| Molar Ratio | Chemicals | Wood Yield (%) | Lignin Yield (%) | Cellulose Yield (%) |
|---|---|---|---|---|
| 5:5:1 | $H_2SO_4:H_2O_2$:Taurine | 42.3% | 0% | 98.5% |
| 10:10:1 | $H_2SO_4:H_2O_2$:Taurine | 44.2% | 0% | 92.3% |
| 20:20:1 | $H_2SO_4:H_2O_2$:Taurine | 42.8% | 0% | 93.3% |

A blend with a ratio of 10:10:1 of sulfuric acid (93% conc. used) to hydrogen peroxide (as 29% solution) to MSA results in a mass recovery of over 28% from wood and over 51.26% for the cellulose control. However, the remaining lignin in the lignin control sample is an indication that the composition is not optimized for lignin removal for some commercial pulp or pulp applications.

A blend with a ratio of 20:20:1 of sulfuric acid (93% conc. used) to hydrogen peroxide (as 29% solution) to MSA results in a mass recovery of over 42% from wood and close to 93% for the cellulose control. The result for the lignin control sample is an indication that the composition is performing very well for lignin removal and can provide some valuable pulp for commercial applications.

The above experiment is a clear indication that a preferred composition according to the present invention not only provides an adequate dissolving acid to delignify plant material but is also valuable in controlling the delignification to prevent the ultimate degradation of cellulosic material into carbon black residue resulting in higher yields potentially for the operators thus increasing profitability while reducing emissions and the risk to the employees, contractors and public.

A method to yield glucose from wood pulp would represent a significant advancement to the current process where the conversion of such is chemical and energy intensive, costly, emissions intensive and dangerous all while not resulting in highly efficient results, especially in large-scale operations. It is desirable to employ a composition which may delignify wood but also allows the operator some control in order to preserve the cellulose rather than degrading it to carbon black resulting in higher efficiencies and yields along with increased safety and reduced overall costs.

According to a preferred embodiment of the method of the present invention, the separation of lignin can be effected and the resulting cellulose fibers can be further processed to yield glucose monomers. Glucose chemistry has a multitude of uses including as a starting block in the preparation of widely used chemicals including but not limited to diacetonide, dithioacetal, glucoside, glucal and hydroxyglucal to name but a few.

According to another preferred embodiment of the present invention, the composition can be used to decompose organic material by oxidation such as those used in water treatment, water purification and/or water desalination. An example of this is the removal (i.e. destruction) of algae on filtration membranes. As such membranes can be quite expensive, it is imperative that they be used for as long as possible. However, given the difficulty to remove organic matter which accumulates on it over time, new approaches are necessary to do so efficiently and with as little damage to the membrane as possible. Mineral acids are too strong and, while they will remove the organic matter, will damage the filtration membranes. A preferred composition of the present invention remedies this issue as it is less aggressive than the mineral acids and, as such, will remove the organic contaminants in a much milder approach, therefore sparing the membrane.

While the foregoing invention has been described in some detail for purposes of clarity and understanding, it will be appreciated by those skilled in the relevant arts, once they have been made familiar with this disclosure that various changes in form and detail can be made without departing from the true scope of the invention in the appended claims.

The invention claimed is:

1. An aqueous acidic composition consisting of:
   sulfuric acid;
   an alkanesulfonic acid; and
   a peroxide,
   wherein said sulfuric acid and said alkanesulfonic acid are present in a molar ratio ranging from 28:1 to 2:1.

2. The composition according to claim 1, wherein said sulfuric acid and said alkanesulfonic acid are present in a molar ratio ranging from 24:1 to 3:1.

3. The composition according to claim 1, wherein said sulfuric acid and said alkanesulfonic acid are present in a molar ratio ranging from 20:1 to 4:1.

4. The composition according to claim 1, wherein said sulfuric acid and said alkanesulfonic acid are present in a molar ratio ranging from 16:1 to 5:1.

5. The composition according to claim 1, wherein said sulfuric acid and said alkanesulfonic acid are present in a molar ratio ranging from 12:1 to 6:1.

6. The composition according to claim 1, where wherein said alkanesulfonic acid is selected from the group consisting of: alkanesulfonic acids where the alkyl groups range from $C_1$-$C_6$ and are linear or branched and combinations thereof.

7. The composition according to claim 1, where said, wherein said alkanesulfonic acid is selected from the group consisting of:
   methanesulfonic acid, ethanesulfonic acid, propanesulfonic acid, 2-propanesulfonic acid, isobutylsulfonic acid, t-butylsulfonic acid, butanesulfonic acid, iso-pentylsulfonic acid, t-pentylsulfonic acid, pentanesulfonic acid, t-butylhexanesulfonic acid and combinations thereof.

8. The composition according to claim 1, wherein said alkanesulfonic acid is methanesulfonic acid.

\* \* \* \* \*